United States Statutory Invention Registration [19]

[11] Reg. Number: H6

Friedman et al. [45] Published: Dec. 3, 1985

[54] GENERATION OF A MODULATED IREB WITH A FREQUENCY TUNABLE BY A MAGNETIC FIELD

[75] Inventors: Moshe Friedman, Washington, D.C.; Victor Serlin, Springfield, Va.

[73] Assignee: The United States of America, Washington, D.C.

[21] Appl. No.: 752,867

[22] Filed: Jul. 8, 1985

[51] Int. Cl.[4] ..... H01J 25/00

[52] U.S. Cl. ..... 315/4.0; 315/5.0

[56] References Cited

U.S. PATENT DOCUMENTS 3,398,376 8/1963 Hirshfield ..... 330/43

OTHER PUBLICATIONS

Patent Application of Lau et al. Ser. No. 389,133, filed Jun. 11, 1982, "Wide-Band Gyrotron Traveling-Wave Amplifier".

M. Friedman et al. "Conversion of The Energy of Intense Relativistic Electron Beams into High-Power Electrical Pulses" Rev. Sci. Instrum. 54(12) December 1983, pp. 1764–1766.

M. Friedman et al. "Propagation of Intense Relativistic Electron Beams Through Drift Tubes With Perturbed Walls", Physical Review Letters, Vol. 50, No. 24, June 13, 1983, pp. 1922–1925.

M. Friedman "Emission of Intense Microwave Radiation From an Automodulated Relativistic Electron Beam", Applied Physics Letters, Vol. 26, No. 7, April 1, 1975, pp. 366–368.

M. Friedman et al., "Interaction of a Modulated Intense Relativistic Electron Beam With a Cavity", Appl. Phys. Lett. 44(4), Feb. 15, 1984, pp. 394–395.

M. Friedman et al., "Generation of a Modulated Intense Relativistic Electron Beam With a Frequency Tunable by a Magnetic Field", Rev. Sci. Instrum. 55(7), July 1984, pp. 1074–1076.

*Primary Examiner*—S. C. Buczinski
*Assistant Examiner*—Linda J. Wallace
*Attorney, Agent, or Firm*—Robert F. Beers; William T. Ellis

[57] ABSTRACT

The present invention comprises a device for generating a modulated intense relativistic electron beam (IREB) with an electronically tunable frequency, comprising: a longitudinally running drift tube; a plurality of gaps in the drift tube including a first gap and a second gap, disposed with a predetermined distance l therebetween; and a plurality of cavities, with a first cavity disposed around the drift tube at the location of the first gap, and a second cavity disposed around the drift tube at the location of the second gap. These first and second cavities are provided with volumes and a geometry such as to excite a predetermined frequency band below the plasma frequency for the device. A circuit is provided for generating an IREB and injecting this IREB to propagate within the drift tube with a predetermined plasma frequency. Additionally, a main magnetic field generating means is provided for generating a magnetic field for confining the IREB to a desired beam diameter. The frequency tuning is obtained by providing an auxiliary magnetic field running parallel to and within the drift tube and located only along a predetermined length between the first and second gaps, with this auxiliary magnetic field being tunable to thereby tune the frequencies of excitations in the first and second gaps. Finally, a means is provided at one end of the drift tube for converting the kinetic energy of the IREB into electrical energy.

12 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

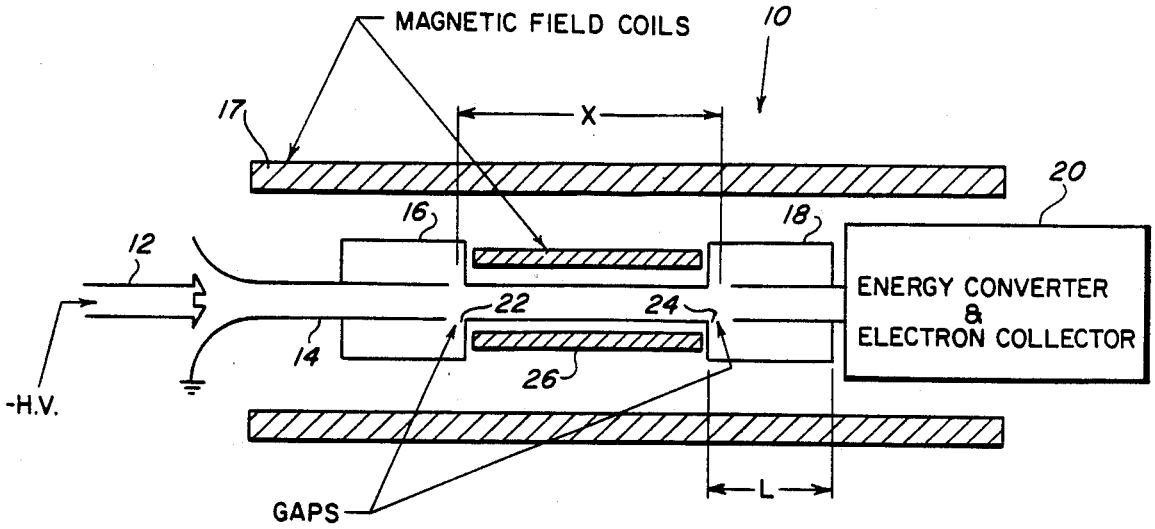
FIG. 1
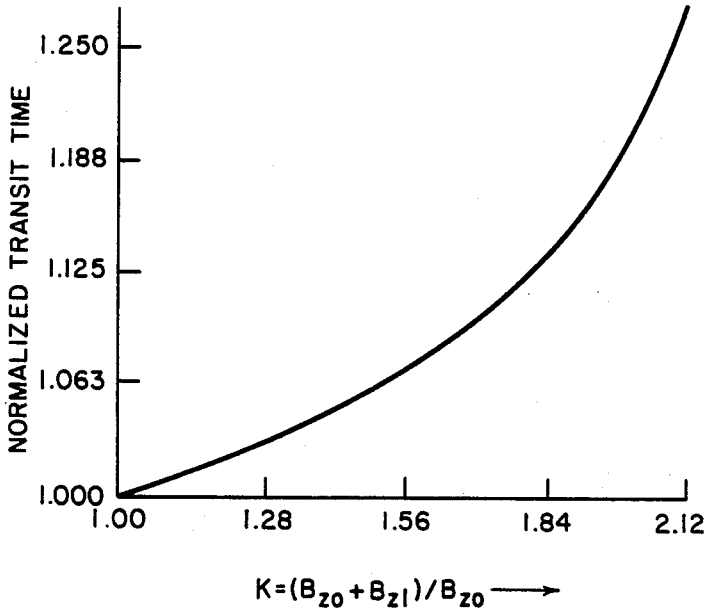
FIG. 2
FIG. 3(a)
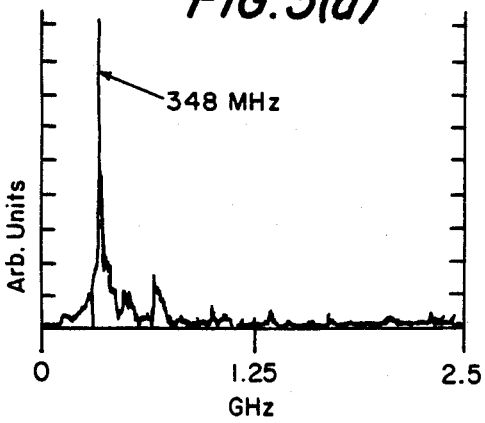
FIG. 3(b)
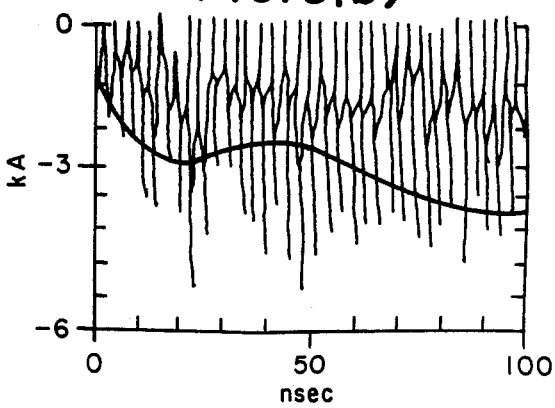

GENERATION OF A MODULATED IREB WITH A FREQUENCY TUNABLE BY A MAGNETIC FIELD

BACKGROUND OF THE INVENTION

The present invention relates generally to devices for modulating intense relativisitic electron beams, and more particularly, to a device for electronically tuning the frequency of the modulation on an intense relativistic electron beam.

A new mechanism capable of modulating an intense relativistic electron beam (IREB) was recently disclosed in the article by M. Friedman, V. Serlin, A. Drobot, and Larry Seftor, Physical Review Letters 50, 1922 (1983). This IREB modulating mechanism can be used to generate a train of high-power electrical pulses (see M. Friedman and V. Serlin, Review of Scientific Instruments 54, 1764 (1983)) and to generate a pulse of high-power rf radiation (see M. Friedman, Applied Physics Letters 26, 366 (1975)). This new mechanism of modulation resembles the classical reflex klystron mechanism in that a reflexing motion of an electron beam within a drift tube produces a circulating current. However, this new mechanism does not have any form of electronic tunability of the frequency of the output current for the electron beam. Such electronic tunability is defined as the ability to change the operating frequency by varying certain electrical parameters. In the case of a reflex klystron, which operates on low density-low voltage electron beams with corresponding low-power levels, the electronic tunability is accomplished merely by changing the voltage on a reflector in the device. However, this principle for electronic tuning used in the reflex klystron is not practical for modulating IREBs, since voltages in the megavolt range would be required to reflex the electrons at this power level. At present, the only available means for tuning the IREB modulation is mechanically by changing the geometry of the modulating structure. In this regard, the output frequency from the modulating structure depends, among other things, on the transit time of an electron between components of the device. This transit time can be changed either by varying the length of the electron trajectory, or by varying the electron velocity. Previously, the output frequency was tuned by the former method, which involved mechanically moving the modulating cavities. Alternately, the frequency could be varied by replacing the modulating cavities by cavities of a different size.

OBJECTS OF THE INVENTION

Accordingly, it is an object of the present invention to electronically tune a fully modulated intense relativistic electron beam.

It is a further object of the present invention to electronically tune the modulated current of a IREB while not changing the total main magnetic field utilized to confine the electron beam.

It is yet a further object of the present invention to electronically tune an IREB without causing an attendant drop in the power of the device.

It is still a further object of the present invention to provide an RF radiation source capable of considerable power and efficiency, which can be electronically tuned.

Other objects, advantages, and novel features of the present invention will become apparent from the detailed description of the invention, which follows the summary.

SUMMARY OF THE INVENTION

Briefly, the present invention comprises a longitudinally running drift tube with a first and second ends; means for generating a reflexing IREB which reflexes within the drift tube between at least two points along the length of the drift tube, with the IREB having a predetermined plasma frequency; means for modulating the IREB to obtain longitudinally spaced bunches of electrons in the drift tube, with the bunches modulated to have a frequency in a band of frequencies below the plasma frequency; and means for generating an auxiliary magnetic field running parallel to and within the drift tube and located along only a predetermined length of the drift tube between the two points, with the auxiliary magnetic field being tunable to thereby tune the modulated frequency within the band of frequencies.

In a preferred embodiment, the reflexing generating means comprises a first gap in the drift tube at one of the two points, and a second gap in the drift tube at the other of the two points; and wherein the modulating means comprises a first cavity disposed around the drift tube at the location of the first gap, and a second cavity disposed around the drift tube at the location of the second gap; and further including means disposed at one end of the drift tube for converting the kinetic energy of the IREB into electrical energy. In this preferred embodiment, the distance x between the first and second gaps is set in order to place the frequency modulation on the IREB when no auxiliary magnetic field is present at a discontinuity in the frequency v. x response curve for the device. Typically, the reflexing generating means will also include means for generating a main magnetic field parallel to and within the drift tube for confining the IREB to a desired beam diameter.

BRIEF DESCRIPTION OF THE DRAWINGS

FIG. 1 is a schematic diagram of one embodiment of the present invention.

FIG. 2 is the graphical response curve of the normalized transit time v. $K=(B_{z0}+B_{z1})/B_{z0}$.

FIG. 3*a* is a graph of the Fast Fourier Transform of dI/dt v. the frequency in gigahertz.

FIG. 3*b* is a graph of the diode current and the modulated current v. time in nanoseconds.

DETAILED DESCRIPTION OF THE PREFERRED EMBODIMENT

Figure 4:
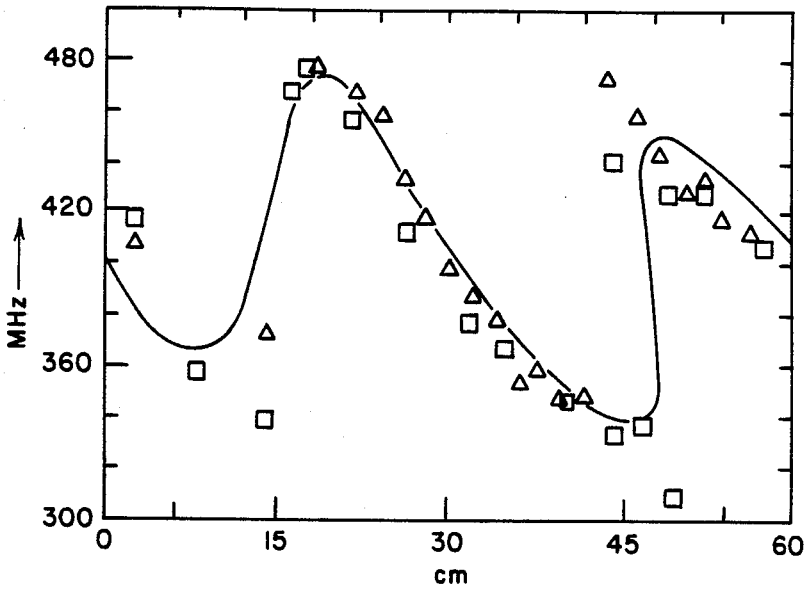
FIG. 4 is a graph showing the frequency dependance on the length l between the two gaps for an auxiliary magnetic field of $B_{z1}=0$.

The frequency tunable modulated IREB of the present invention is shown as the device 10 in FIG. 1. This device 10 comprises a circuit 12 for generating an intense relativistic electron beam (IREB), a drift tube 14 for propagating this IREB along a predetermined path, and a modulating circuit including the cavities 16 and 18 for modulating the frequency of the current in the IREB propagating in the drift tube 14 to thereby obtain longitudinally spaced bunches of electrons in the drift tube 14 in accordance with this modulating frequency. The device 10 further includes an energy converter and electron collector device 20 for converting the kinetic energy of the electron bunches in the electron beam in the drift tube 14 into electrical energy, and for collecting the electrons from the beam. A main magnetic field generating means 17 is provided to confine the IREB within the drift tube 14 to a desired diameter. An auxiliary magnetic field generating means 26 is provided to electronically tune the frequency of modulation on the IREB.

A first gap 22 is formed in the drift tube 14 and a second gap 24 is formed in the drift tube a predetermined distance x from the first gap 22. The first cavity 16 is then disposed around the drift tube 14 at the location of the first gap 22. Likewise, the second cavity 18 is disposed around the drift tube 14 at the location of the second gap. One of the purposes of the first and second gaps 22 and 24 is to provide communication between the electron beam propagating in the drift tube 14 and the outer coaxial volumes of the cavities 16 and 18. A second reason for the gaps 22 and 24 is to generate a very high electric field between the electron beam at that point and the end walls of the respective cavities. In essence, these very high electrical fields form virtual cathodes at these gaps which the majority of the electrons in the electron beam cannot overcome. Accordingly, these virtual cathodes reflect the majority of electrons in the electron beam causing a large circular or reflexing motion of the electron beam between the two gaps 22 and 24. It should be noted that this very large electric field between the end cavity walls and the electron beam is a self electric field produced by the electron beam, and not an applied electric field. The cavities 16 and 18 are excited by this reflexing motion. The frequency of excitation in these cavities is determined by the basic parameters of the cavity, and by the time it takes for the electron to propagate from the cavity 16 to the cavity 18 and then back.

Once the basic geometry parameters for the cavities 16 and 18 are set, the operational frequency for the device will depend only on the time it takes an average electron to transit from the modulating cavity to a reflection point and back. Once the length between the gaps 22 and 24 is set, then this transit time can be changed only by changing the velocity of the electrons propagating therebetween.

The present device operates to change the velocity of the electrons in the IREB without changing the injected electron energy at the IREB source 12. In the present invention, the change in velocity of the electrons is based on the use of the space-charge field that the IREB generates as it propagates through the drift tube 14. More specifically, the IREB generates a potential difference between itself and the walls of the drift tube 14. The velocity of the electrons in the IREB depends on the value of this potential difference. For an infinitely thin annular IREB of radius $r_0$ guided by a strong axial magnetic field $B_{z0}$ inside the conducting drift tube 14 having a radius $r_w$, the velocity of the electrons v can be derived from the following relationships:

$$I/I_o = \beta(\gamma - \gamma_o), \tag{1}$$

$$I_o = \frac{2\pi\epsilon_o m_o c^3}{e\ln(v_w/v_o)}, \tag{2}$$

where $\beta = v/c$, $\gamma = (1 - \beta^2)^{-\frac{1}{2}}$, $\gamma_o = 1 + (eV/m_oc^2)$, and where eV is the energy of the electrons that are injected into the drift tube. From the above equations, it can be seen that the velocity of the electrons can be changed simply by varying the ratio $r_w/r_0$. Since $r_w$ is the radius of the drift tube, and is constant, the velocity of the electrons can be changed simply by varying the radius of the electron beam. Using the well-known Buschs' theorem:

$$r_0^2B_z = r_0^2(B_{z0} + B_{z1}) = \text{constant}, \tag{3}$$

it can be seen that the radius of the IREB can be easily changed simply by varying the total magnetic field at a particular point along the length of the drift tube.

In order to accomplish this velocity variation of the IREB, an auxiliary magnetic field $B_{z1}$ is applied parallel to and within the drift tube at one or more points between the gaps 22 and 24. In order to implement this application of an auxiliary magnetic field, the auxiliary magnetic field means 26 is disposed around the drift tube between the gaps 22 and 24. In essence, by increasing the auxiliary magnetic field in the direction parallel to the main magnetic field $B_{z0}$ at one or more points between the gaps 22 and 24, the magnetic field at these points actually compresses the electron beam at these points into a smaller radius. This smaller radius beam causes an increase in the voltage between the walls of the drift tube 14 and the IREB. This increase in the voltage therebetween slows the IREB velocity. It should also be noted that in the same sense that compressing or necking down the radius of the IREB slows the beam down, the expansion of the beam radius will increase the speed of the beam. Such an expansion of the beam would be obtained by providing an auxiliary magnetic field $B_{z1}$ anti-parallel to the main magnetic field $B_{z0}$ to decrease the local magnetic field at the point or points of application.

The change of the transit time between the gaps 22 and 24 as a function of $K = (B_{z1} + B_{z0})/B_{z0}$, is derived using equations 1, 2, and 3, and is shown in FIG. 2.

In the embodiment shown in FIG. 1, the IREB generating circuit may be comprised of a foilless diode of the type disclosed in the article by M. Friedman and M. Ury. The Review of Scientific Instruments, volume 41, number 9, pages 1334–1335, September 1970, and volume 43, page 1659 (1972). Foilless diodes are advantageous in that they can be used repetitively. (There is no foil to be destroyed.) The IREBs generated by a foilless diode may take a variety of shapes including annular and solid.

In the foilless diode 12 shown in FIG. 1, an annular IREB with a radius of approximately 2.0 cm, and a beam thickness of approximately 0.3 cm was utilized. The diode was energized by a voltage pulse of approximately 700 kV and generated a current of less than or equal to 7 kA for a duration of 120 nsec. This IREB was directed into the drift tube 14.

The drift tube 14 may have a radius $r_w$ of approximately 2.35 cm with a length of approximately 1 meter. Typically, the entire system is evacuated to less than $10^{-4}$ Torr of air. The drift tube may be made of stainless steel tubing.

As noted previously, the magnetic field generating means 17 is provided in order to generate the main magnetic field parallel to and within the drift tube for confining the IREB within the drift tube 14, and for guiding it there along to the gaps 22 and 24. This confining magnetic field may be generated by a dc or a pulse magnetic coil or by means of a dc superconducting coil. In FIG. 1, 17 designates a solenoid coil comprising either continuous or pancake solenoid coils. By way of example, the coils 17 of FIG. 1 may be utilized to generate a 10 kG quasi-dc magnetic field for confining the beam.

A variety of circuits may be utilized to provide the initial frequency modulation for the IREB with the at least one frequency to obtain longitudinally spaced bunches of electrons in the drift tube 14. In the embodiment shown in FIG. 1, a passive circuit is utilized comprising two or more cavities 16 and 18 disposed around the drift tube 14 at the location of the gaps 22 and 24, respectively. The gaps 22 and 24 allow the cavities to communicate with the IREB. In essence, these cavities 16 and 18 operate to store energy and then to add or subtract energy from the IREB propagating along the path of the drift tube 14. The mutual interaction between the cavities 16 and 18 and the IREB causes the modulation of the IREB to one or more frequencies. This modulation takes the form of longitudinally spaced bunches of electrons along the drift tube 14. The precise frequency of this initial modulation of the IREB depends on the geometry of the cavities (i.e., the volume and width of the individual cavities), the distance between the gaps 22 and 24, the size of the gaps 22 and 24, and the shape of the gaps 22 and 24. Essentially, by changing the geometry of the cavities and/or the shape and size of the gaps, the frequency of modulation of the IREB is changed.

In FIG. 1, the cavities 22 and 24 are shown as being disposed coaxially around the drift tube 14 with the cavities disposed serially along the length of the drift tube. It should be noted that this serial and coaxial configuration of the cavities is set forth by way of example only. The only requirement for the cavity location is that the cavities be symmetric about the beam so that the beam is not disturbed. Accordingly, these cavities need not be annular in shape, but may take a radial shape.

It should also be noted that although two cavities are shown in the embodiment of FIG. 1, any number of cavities may be conveniently utilized, provided that there are at least two such cavities. For configurations with more than two cavities, a series of reflexing beam loops will develop between adjacent drift tube gaps, as well as one or more large circulating current loops joining more than two gaps. For further information of this type of passive IREB modulation, see the article by M. Friedman, Physical Review Letters, volume 32, number 3, page 92 (21 Jan. 1974); and the article by M. Friedman, V. Serlin, A. Drobot, and L. Seftor, Physical Review Letters, volume 50, number 24, page 1922 (13 June 1983).

The coaxial cavities shown in FIG. 1 were provided with a length L of approximately 16 cm and of a characteristic impedance $Z_c$ of approximately 68 ohms.

The auxiliary magnetic field generating circuit may simply comprise a standard solenoid coil or a pancake coil. This auxiliary coil 26 may be disposed along only a short section of the distance l between the gaps 22 and 24, or it may be disposed to have any length up to the entire length l between the gaps 22 and 24. Typically, this auxiliary coil 26 will be used to vary the magnetic field by plus or minus 10% of the main magnetic field. Accordingly, for a main magnetic field of 10 kG, the auxiliary magnetic field would have a range of approximately −1 kG to +1 kG.

In an earlier experiment without the auxiliary magnetic field, i.e., $B_{z1}=0$, the IREB that emerged for the second gap 24 was modulated by the cavities and the overall geometry of the device. The frequency spectrum of the modulation was monochromatic, and depended especially on the length l between the two gaps 22 and 24. FIG. 3*a* shows the current modulation in terms of frequency, and FIG. 3*b* shows the current modulation in terms of time. FIG. 4 shows the dependency of the frequency spectrum on the length l between the gaps 22 and 24.

Figure 5:
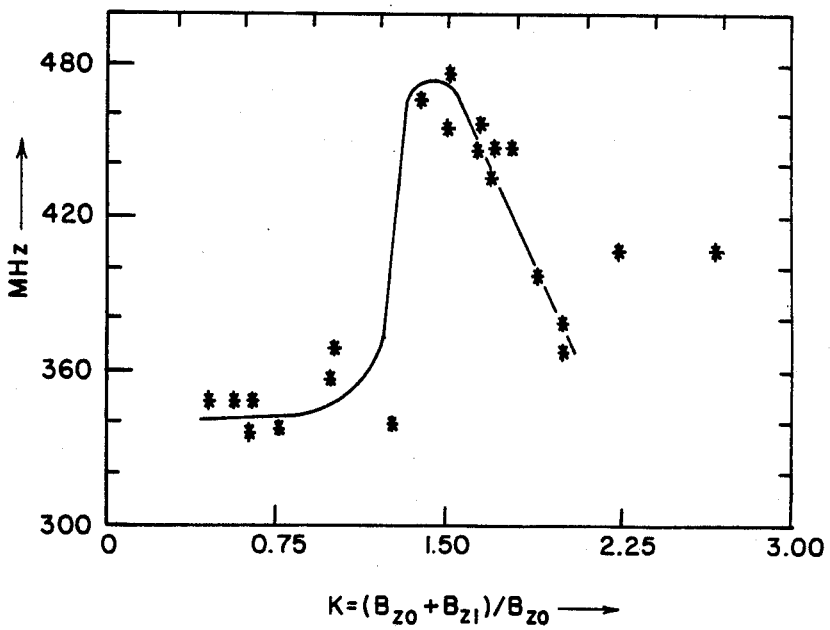
FIG. 5 is a graph showing the dependency of the frequency on $K=(B_{z0}+B_{z1})/B_{z0}$, for $l=13$ cm. Note that in FIGS. 3*a*, 4, and 5, the uncertainty in the frequency is plus or minus 5 MHz.

In the experiment run on the present device with the auxiliary coil 26 energized, i.e., $B_{z1}$ not equal to 0, a change in the frequency of the modulation of the IREB was observed. FIG. 5 shows the dependency of this frequency spectrum on the ratio $K=(B_{z0}+B_{z1})/B_{z0}$. The distance between the gaps for this experiment was $l=13$ cm. FIG. 5 demonstrates that electronic tunability was achieved simply by varying currents in the auxiliary magnetic field coil 26. The maximum tunability achieved in this particular experiment run on the device of FIG. 1 was $$df/dk \approx 65 \text{ Mc/s, or } df/f \approx 0.34.$$

The total efficiency achieved in this experiment was on the order of 50%.

From a review of FIG. 4, it can be seen that there are certain discontinuities at approximately the length 13 cm and 45 cm. By properly choosing the length l between the gaps 22 and 24 to be near these discontinuities shown in FIG. 4, then a jump in the frequency spectrum may be induced simply by slightly varying the parameter K. This jump in the frequency spectrum can be observed from a review of FIG. 5. For further information on this point, please refer to applicant's article M. Friedman and V. Serlin, The Review of Scientific Instruments, 55(7), July 1984. It can be seen that by appropriately choosing this length l to be at a discontinuity, a maximum change in the tuning frequency can be obtained. For devices with parameters other than that shown in the present design, these discontinuties can be located empirically.

Only 40% of the electrons contained in the input IREB ended in the bunches of the output beam. It was found that the kinetic energy of the electrons in the bunches increased by a factor of approximately 1.4 due to the reflex klystron mechanism, in comparison to the electrons from the electron gun. Hence, the total efficiency in this experiment was greater than or equal to 50%. The electrons that were not in the bunches emerged out of the experiment as a "dc" background.

An energy converter and electron collector means 20 is disposed at the far end of the drift tube 14 in order to convert the kinetic energy from the bunches of electrons in the IREB into electrical energy and to collect the electrons. Such energy conversion and electron collection devices are well known in the art. By way of example, but not by way of limitation, the energy converter and electron collector 20 may be realized simply by a harmonic slow wave structure, or simply by a waveguide, or by a cavity with a coaxial cable or transmission line connected thereto. This device also may be implemented by the coaxial transmission line design disclosed in patent application Ser. No. 661,838, filed on 17 Oct. 1984, by M. Friedman and V. Serlin. The Friedman-Serlin article also discusses in more detail the equations for the electronic admittance for the IREB and the dependence of the electronic admittance on the parameters $r_w/r_0$ and $\beta$. In essence, a review of this electronic admittance equation discloses that by compressing the IREB, the $\beta$, which is equal to v/c, decreases and various other parameters increase. All of these changes resulting from the compression in turn influence the spectrum in the same fashion as if the separation x between the gaps had been increased.

It should be noted that the plasma frequency for devices utilizing IREBs is determined by the beam current and the beam geometry. The calculation of the plasma frequency is well known in the art and is discussed in a variety of references including the reference R. E. Collin, *Foundations for Microwave Engineering,* McGraw-Hill, New York, 1966, pages 434–472. In the prior art, devices utilizing a relatively low density electron beam operate above the plasma frequency in order to generate the klystron mechanism. In contradistinction, the present invention has a high density electron beam (IREB) and is specifically designed to operate below the plasma frequency. In this range of frequencies below the plasma frequency, the self-electric field generated between the electron beam and the drift tube walls becomes important, and can be utilized to obtain the reflex klystron modulation of the cavities. In the present design, the plasma frequency is on the order of 15 GHz. In the actual experiments carried out on the present device, a frequency range of 60 MHz–3 GHz was utilized. However, this device could definitely be operated above this frequency range.

It should be noted that in most prior art devices using magnetic field for the tunability of the frequency generated, that frequency is proportional to the total magnetic field. In contradistinction, the present design does not provide a frequency which is proportional to the total or absolute value of the magnetic field. In the present design, the tunability of the frequency is obtained simply by compressing or expanding the radius of the electron beam by means of a small local magnetic field which extends only over a short length of the drift tube. Accordingly, there is no requirement to change the absolute value of the magnetic field, which would change the confinement characteristics for the IREB. This design using a local auxiliary magnetic field over a small length of the drift tube permits a very small current change to effect a large frequency tuning.

It has been shown that the frequency of a modulated intense relativistic electron beam can be electronically tuned with a range of tunability of df/f approximately equal to 34%. The efficiency of the bunching obtained in the experiment run on the present device is of the order of 50%. The energy of the bunches can be converted to electrical pulses or to rf radiation with a power level of $10^9$–$10^{10}$ W. Accordingly, this device provides a new RF source with a considerably higher power and efficiency over existing devices such as reflex klystrons. Moreover, the device has an obvious advantage in speed and ease of operation over older mechanical methods of tuning. It should be noted in particular that this device does not drop the power level of the radiation when it is tuned 30–40% from the main frequency.

Obviously, many modifications and variations of the present invention are possible in light of the above teachings. It is therefore to be understood that within the scope of the appended claims, the invention may be practiced otherwise than as specifically described.

What is claimed and desired to be secured by letters patent in the United States is:

1. A device for generating a modulated intense relativistic electron beam (IREB) with an electronically tunable frequency, comprising:

a longitudinally running drift tube with a first and second ends;

a plurality of gaps in said drift tube including a first gap in said drift tube, and a second gap in said drift tube disposed a predetermined distance x from said first gap;

a plurality of cavities, with a cavity disposed around said drift tube at the location of each of said plurality of gaps, said plurality of cavities including a first cavity disposed around said drift tube at the location of said first gap, and a second cavity disposed around said drift tube at the location of said second gap, said first and second cavities having volumes and geometry such as to excite a predetermined frequency band below a plasma frequency;

means for generating an intense relativistic electron beam (IREB) and injecting said IREB to propagate within said drift tube from said first end, and having said predetermined plasma frequency;

main magnetic field generating means for generating a magnetic field running parallel to and within said drift tube for confining said IREB to a desired beam diameter;

auxiliary magnetic field generating means for generating an auxiliary magnetic field running parallel to and within said drift tube and located only along a predetermined length between said first and second gaps, said auxiliary magnetic field generating means being tunable to thereby tune the frequency of excitation in said first and second cavities; and means disposed at the second end of said drift tube for converting the kinetic energy of said IREB into electrical energy.

2. A device as defined in claim 1, wherein said IREB generating means comprises a foilless diode.

3. A device as defined in claim 2, wherein said first and second cavities are formed coaxially around said drift tube at the first and second gap locations, respectively.

4. A device as defined in claim 3, wherein said auxiliary magnetic field generating means comprises means for generating said auxiliary magnetic field within said drift from said first gap to said second gap.

5. A device as defined in claim 1, wherein said distance x between said first and second gaps is set in order to place the first and second cavity excitation at a discontinuity in the frequency v. x response curve when there is no auxiliary magnetic field.

6. A method for tuning a modulated intense relativistic electron beam, comprising steps of:

generating an intense relativistic electron beam (IREB) and injecting said IREB into a drift tube to propagate along a path in said drift tube, said IREB facilitating a predetermined plasma frequency;

causing said IREB to reflex in said drift tube between at least two points along the length of said drift tube;

modulating said IREB to obtain longitudinally spaced bunches of electrons in said drift tube at a frequency within a predetermined frequency band which is below said plasma frequency;

generating a main magnetic field running parallel to and within said drift tube for confining said IREB to a desired beam diameter;

generating an auxiliary magnetic field running parallel to and within said drift tube and located only along a predetermined length between said first and second points;

tuning said auxiliary magnetic field to thereby tune the frequency of modulation within said predetermined frequency band; and converting the kinetic energy of said IREB into electrical energy.

7. A method as defined in claim 6, wherein said reflex causing step includes the step of choosing the distance x between said at least two points along the length of said drift tube in order to place the IREB frequency modulation at a discontinuity in the frequency v. x response curve where there is no auxiliary magnetic field.

8. A device for electronically tuning the modulation frequency of an intense relativistic electron beam (IREB), comprising:

a longitudinally running drift tube;

means for generating a reflexing IREB which reflexes within said drift tube between at least two points along the length of said drift tube, said IREB having a predetermined plasma frequency;

means for modulating said IREB to obtain longitudinally spaced bunches of electrons in said drift tube, with the bunches modulated to have a frequency in a band of frequencies below said plasma frequency;

means for generating an auxiliary magnetic field running parallel to and within said drift tube and located along only a predetermined length of said drift tube between said two points, said auxiliary magnetic field being tunable to thereby tune said modulated frequency within said band of frequencies.

9. A device as defined in claim 8, wherein said reflexing generating means comprises a first gap in said drift tube at one of said two points, and a second gap in said drift tube at the other of said two points; and wherein said modulating means comprises a first cavity disposed around said drift tube at the location of said first gap, and a second cavity disposed around said drift tube at the location of said second gap; and further including means disposed at one end of said drift tube for converting the kinetic energy of said IREB into electrical energy.

10. A device as defined in claim 9, wherein there is a distance x between said first and second gaps which is set in order to place the frequency modulation on said IREB when no auxiliary magnetic field is present at a discontinuity in the frequency v. x response curve for the device.

11. A device as defined in claim 10, wherein said reflexing generating means includes:

means for generating an IREB and injecting said IREB to propagate within said drift tube; and means for generating a main magnetic field parallel to and within said drift tube for confining said IREB to a desired beam diameter.

12. A device as defined in claim 11, wherein said auxiliary magnetic field generating means comprises means for generating said auxiliary magnetic field within said drift tube from said first gap to said second gap.

* * * * *